United States Patent
Biles

[15] 3,656,551
[45] Apr. 18, 1972

[54] PREVENTING SCALE ADHERENCE IN OIL WELLS

[72] Inventor: Jerry W. Biles, Tulsa, Okla.
[73] Assignee: Cities Service Oil Company
[22] Filed: Apr. 20, 1970
[21] Appl. No.: 30,327

[52] U.S. Cl. .......................... 166/279, 166/310, 252/8.55 B
[51] Int. Cl. .................. C02b 5/00, C23f 11/14, E21b 43/25
[58] Field of Search .............. 252/8.55 B, 8.55 D; 166/279, 166/275, 310, 305 R, 274

[56] References Cited

UNITED STATES PATENTS

| | | | |
|---|---|---|---|
| 2,331,594 | 10/1943 | Blair, Jr. | 166/305 R |
| 2,779,418 | 1/1957 | Garst | 166/305 R |
| 2,908,643 | 10/1959 | Thompson et al. | 166/305 R |
| 2,908,641 | 10/1959 | Boyle | 166/305 R |
| 2,908,642 | 10/1959 | Thompson et al. | 166/305 R |
| 3,528,502 | 9/1970 | Oleen | 166/279 X |
| 2,777,818 | 1/1957 | Gambill | 166/310 UX |
| 3,523,582 | 8/1970 | Fulford | 166/310 X |

Primary Examiner—Stephen J. Novosad
Attorney—J. Richard Geaman

[57] ABSTRACT

The wellbore, fractures, and adjacent matrices are soaked with solutions of aliphatic amines for several hours, after which they are pushed by a slug of solvent into the formation matrix. Subsequently, normal production is resumed. This treatment prevents scale accumulation on the treated surfaces, whereas untreated surfaces will accumulate copious quantities of the precipitating solid. The chemical nature of the treating compound is such that the compound tends to migrate from the treatment solution to the solid surfaces in the wellbore, fractures, and formation matrices, thereby giving treatment which prevents scale buildup which, if it were not prevented, would decrease the rate of oil production.

11 Claims, No Drawings

PREVENTING SCALE ADHERENCE IN OIL WELLS

BACKGROUND OF THE INVENTION

This invention relates to the prevention of gypsum scale formation in production wells. More particularly, it relates to a method for treating production wells and equipment with a solution which prevents gypsum scale adherence to the formation matrix, production equipment and producing wellbore during the production of oil accompanied by water production.

Petroleum production from underground reservoirs is often accompanied by large quantities of water production from formations having a considerable calcium sulfate composition. Gypsum scale is often precipitated from the water phase in the production well formation matrices and on the production equipment. The gypsum scaling occurs not only in the reservoir itself and in the wellbore, but also upon the tubular goods, surface lines and tanks. The scale precipitates due to two phenomena, one mechanism being the chemical changes which occur from the mixing of incompatible waters and the other from radical physical changes, such as a decrease in temperature or pressure which affords less solubility to the gypsum in the water phase. Precipitation of the gypsum scale on the wellbore, formation matrices, and wellbore production equipment results. The deposits cling to the exposed solid surfaces, including casing, pump rods, tubing, and in the case of open-home completions, to the formation itself. Deposits on the rods and pumps mechanically interfere with the operation of the pump and therefore, with the production from the well. Deposits on the formation walls and matrices, fractures and wellbore, or in any part of the tubular arrangement used for production in some instances becomes of such magnitude that oil production is hindered or stopped completely.

Prior solutions to the inhibition of gypsum scale formation may be classified as remedial or preventive. Generally, remedial measures include both physical and chemical methods for removing deposited scale. The most generally applied of the physical methods of scale removal is the practice of scraping surface equipment, but such scraping of wellbores is extremely expensive and time consuming, affording loss of production while the wellbore is being cleaned. In some circumstances, the best remedial method consists of removing the rods, pump, and tubing from the production well, moving in a drilling rig and drilling the gypsum scale deposit from the wellbore. When an expandable bit is used to increase the wellbore radius, the resulting "underreaming" of the gypsum scale and wellbore frequently enhances production. In many instances, however, this underreaming operation generally is of short term benefit as gypsum scale rapidly accumulates in amounts sufficient to again inhibit production. Another frequently used treatment to remedy scaling in wellbores, fractures and matrices is hydraulic fracturing. By this method tremendous amounts of fluid are forced into the production wellbore under pressure to hydraulically fracture the surrounding formation. By this procedure the scale-up area of the formation is bypassed by a fracture into the undamaged reservoir. These treatments are generally ineffective in multiple application as they exhibit the inability to open new fractures in parts of the formation not already heavily built up with scale.

Remedial solutions of the chemical variety generally involve the use of two stage treatments using solutions of hydroxides, carbonates, and bicarbonates followed by an acid so that the gypsum is converted to an acid-soluble form and then dissolved with hydrochloric acid and flushed from the wellbore. Two stage treatments are unsatisfactory as the reactants of the scale and treating solution physically obstruct treatment of underlying portions of scale, so that many repetitions of the treatment are required to sufficiently remove the scale deposit so as to completely restore production. In addition, such treatments are time consuming and thereby cause considerable loss of production during the period of treatment. Another chemical method of a remedial nature is the use of salts of an ethylene diamine tetra acetic acid (EDTA) solution to remove the gypsum formation in the wellbore. This method is also unsatisfactory as the gypsum is dissolved very slowly and the expense of the EDTA does not make it an economically attractive treatment.

Gypsum scale formation may also be prevented by the addition of certain polymers to the produced water in the wellbore. These polymers function by keeping the offending materials in true solution by forming complex ions, or by altering the crystalline structure of the initial precipitate so that the colloidal sized particles of the initial precipitate may not form a nucleus for further crystal growth. The polymers most often applied in this preventative method are sodium hexametaphosphate, sodium tripolyphosphate, and organic phosphates and phosphonates. Several disadvantages are related to the use of these polymers. These disadvantages include the necessity of expending a certain quantity of polymer for every unit of scale present, the difficulty of applying polymer within the matrix of the formation where scaling also is prevalent, and the high cost of the polymers.

What is required is a treating method which obtains maximum use of its active ingredient and in which this ingredient is absorbed on metal and rock surfaces of the production wellbore, wellbore production equipment and the immediate vicinity of the production formation matrix, thereby rendering said surfaces nonabsorbent for further scale production. The treatment solution should be a one-step operation to minimize lost production time and should prevent gypsum scale formation over the productive interval of the petroleum producing formation.

It is an object of the present invention, therefore, to provide for an improved method for the prevention of gypsum scale formation in oil producing wells.

It is another object of the invention to provide for an improved process whereby a single treatment of a production wellbore inhibits further gypsum formation in the formation matrix, production wellbore and producing equipment.

It is another object of the invention to provide a method for enhancing the oil production from an oil well which has a high water to oil producing ratio and has a history of gypsum scale formation.

With these and other objects in mind, the invention is hereinafter set forth in detail.

SUMMARY OF THE INVENTION

The objects of the present invention relate to a method for treating a production wellbore, nearby formation matrix, and production wellbore equipment which is subjected to gypsum scale deposition. The method comprises introducing into the producing wellbore a treating solution of a solvent with an aliphatic amine dissolved therein. The method further comprises soaking the production wellbore, nearby formation matrix and production wellbore equipment with the treating solution. Typical amines utilized are selected from the group consisting of lauryl, myristyl, palmityl, stearyl, oleyl, linoleyl and linolenyl amines. A preferred embodiment of the invention utilizes a solvent of isopropyl alcohol with an aliphatic amine dissolved therein. A 10 percent by volume solution of the amine in isopropyl alcohol is preferred.

The method may further comprise introducing a slug of fluid subsequent to the soaking step to displace the treatment solution into the formation matrix and further prevent deposition of gypsum scale in the vicinity of the production wellbore. The displacing fluid may consist of isopropyl alcohol, water or other suitable fluids which will not damage the formation matrix and will place the treating solution further from the production well.

DETAILED DESCRIPTION OF THE INVENTION

In the mechanics of producing oil, it is not important whether solids precipitate from water produced with the oil if these solids do not accumulate where they will impede the influx of fluids. Obviously, accumulations of scale in the formation matrix, fractures, on the side of the wellbore and on the metallic surfaces of the production string can be obstacles to fluid production. I have found a novel method by which these accumulations of gypsum scale in an oil well may be prevented. In the practice of the invention, the wellbore, fractures, and adjacent formation matrix are soaked with solutions of an aliphatic amine dissolved in a solvent. The treating solution is allowed to soak for several hours, after which normal production is resumed. Subsequent to the treatment, scale does not tend to accumulate on the treated surfaces; whereas, without treatment the surfaces accumulate copious quantities of the precipitating solid. It has been noted that by this method the incipient scale is not chelated or complexed, but simply deprived of a favorable site for nucleation. By the present technique, the chemical nature of the treating compounds is such that they migrate from the solvent to the solid surfaces to which the solution is exposed. The treating compound forms a film which covers the nucleation sites and vents further gypsum scale formation upon the treated formation matrix, wellbore and production equipment.

In practice it has been found that amines such as those selected from the group consisting of lauryl, myristyl, palmityl, stearyl, oleyl, linoleyl and linolenyl amines are highly preferred filming agents for combination with the solvent in the treating solution. It has further been found that a solvent which is especially suitable for solution of these amines is isopropyl alcohol. Amine solutions in concentrations up to 100 percent have proved effective, but amine concentrations between about 5 and about 15 percent by volume are preferred. Suitable solvents other than isopropyl alcohol include methyl and ethyl alcohol, light petroleum distillates and other organic solvents.

Several experiments were performed in the laboratory to determine the relative effectiveness of various filming agents for prevention of gypsum scale deposition.

EXAMPLE 1

Four filming agents were tested against a control to determine the effectiveness of the filming agents in preventing gypsum scale deposition. For the test, glass slides were dipped in isopropanol solutions of the filming agents, rinsed under a stream of tap water 15 seconds and then immersed in a solution of supersaturated calcium sulfate. After allowing several hours for gypsum crystals to form on the treated slides, they were removed from the supersaturated solution and allowed to dry at room temperature. The weight of the adherent scale was obtained by subtracting the original weight of the glass slide from the weight of the dry scale and slide after the test. A glass slide not treated with a filming agent was included in the procedure as a control. The control provided a comparison of the untreated surface to the surfaces treated with filming agents. The weight gain of the treated slides are represented in the table given below as percent by weight of the amount of scale on the control slide. As can be discovered, the use of oleyl amine reduced the gypsum scale to 17 percent of that of the scale on the untreated or control surface.

| Filming Agent | Grams of scale | Percent Scale Relative to Control |
|---|---|---|
| Control | 0.2484 | — |
| Dodecyl Benzene Sulfonate | 0.1873 | 75 |
| Silicone Polymer | 0.0533 | 21 |
| Oleyl Amine | 0.0427 | 17 |

EXAMPLE 2

Similar tests were performed as related in Example 1 using individual gypsum crystals as a substrate in place of the glass slides. The use of the gypsum crystals is more representative of the actual surfaces exposed to additional gypsum scaling in the wellbore, production equipment and formation matrices. Although wells are drilled-out, under-reamed, and the production equipment scraped to remove the gypsum scale deposits, there will be some gypsum scale crystals on the wellbore, in the formation matrices and on the production equipment to give an active nucleation site for further gypsum scale deposition. In this experiment the crystals were dipped monentarily in a 10 percent by volume isopropanol solution of each filming agent before being suspended in a supersaturated gypsum solution in water. An untreated crystal was used as a control. The following table represents a typical set of data obtained for the various treating agents which were used.

| Filming agent | Original crystal plus scale, grams | Original crystal only, grams | Accumulated scale, grams | Percent scale relative to control |
|---|---|---|---|---|
| Control | 0.0949 | 0.0651 | 0.0298 | — |
| Lauryl amine | 0.0944 | 0.0695 | 0.0249 | 83 |
| Myristyl amine | 0.0782 | 0.0667 | 0.0115 | 39 |
| Oleyl amine | 0.0913 | 0.0890 | 0.0023 | 7.7 |

It can be discerned from the study that the lauryl, myristyl and oleyl amines gave protective films which would decrease growth of previously scaled-up surfaces in production wells. It is further noted that the longer carbon chain length oleyl amine, having 18 carbon atoms, was far superior to the other amines, such as the 12 carbon chain length lauryl amine. It is therefore a preferred embodiment of the present invention to use carbon chain lengths of at least about 12 and preferrably between about 12 and about 18 in practicing the invention.

In the application of the present invention the production wellbore is preferrably soaked with the treating solution for at least 2 hours and more usually between about 2 and about 8 hours. In most applications the productive portion of the wellbore is filled with treating solution. Subsequent to the soaking step a slug of fluid may be introduced to displace the treating solution into the formation matrices and thereby further treat the formation. By use of the displacing fluid gypsum scale deposition may be prevented further from the producing wellbore. With this procedure, gypsum scale deposition in the vicinity of the producing wellbore is controlled so that interference with oil production due to adherent scale is significantly decreased. Typical fluids which may be used for the displacing fluid are organic solvents such as isopropyl alcohol, and in particular, the use of water as the displacement media is applicable.

The present invention provides a scale preventing film which can be applied as a liquid to treat the capillaries of porous rock, production wellbore and production equipment. The present invention does not suffer the disadvantage of being spent in the formation before gypsum scale deposition is inhibited. The inhibitor need not be added at the injection wells, thereby avoiding absorption losses due to the enormous surface area contacted by injection water. The present invention provides an effective means for the prevention of gypsum scale deposition in production wells in a single step treatment which is both economical and easily applied under field conditions.

While the invention has been described above with respect to certain embodiments thereof, it will be understood by those skilled in the art that various changes and modifications may be made without departing from the scope of the invention as set forth herein.

Therefore, I claim:

1. A method for treating a production wellbore, nearby formation matrices and production wellbore equipment subjected to gypsum scale deposition, which comprises:
   a. introducing a treating solution, capable of preventing gypsum scale deposition, consisting essentially of a solvent with an aliphatic amine dissolved therein in the production wellbore; and
   b. soaking the production wellbore, immediate formation matrix and production wellbore equipment with the treating solution.

2. The method of claim 1 in which the amine is selected from the group consisting of lauryl, myristyl, palmityl, stearyl, oleyl, linoleyl and linolenyl amines.

3. The method of claim 1 in which the amine has a carbon chain length of at least about 12.

4. The method of claim 1 in which the amine has a carbon chain length between about 12 and about 18.

5. The method of claim 1 in which the aliphatic amine is oleyl amine.

6. The method of claim 1 in which the solvent is isopropyl alcohol.

7. The method of claim 1 in which the treatment solution contains between about 5 and about 15 percent by volume of the amine in the solvent.

8. The method of claim 1 in which the soaking period is at least 2 hours.

9. The method of claim 1 further comprising introducing a slug of fluid subsequent to the soaking step to displace the treatment solution into the formation matrix.

10. The method of claim 9 in which the slug of fluid is isopropyl alcohol.

11. The method of claim 9 in which the slug of fluid is water.

* * * * *